(12) United States Patent
Flanagin

(10) Patent No.: US 6,560,660 B1
(45) Date of Patent: May 6, 2003

(54) FACILITATING COMMUNICATIONS PORT SHARING

(75) Inventor: Stephen D. Flanagin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/496,819

(22) Filed: Feb. 2, 2000

Related U.S. Application Data

(60) Provisional application No. 60/137,847, filed on Jun. 7, 1999.

(51) Int. Cl.$^7$ .............................................. G06F 13/20
(52) U.S. Cl. ............................ 710/15; 710/8; 717/109
(58) Field of Search ..................... 710/8–19, 36–39, 710/48–50, 61; 709/238; 744/43, 48; 717/109

(56) References Cited

U.S. PATENT DOCUMENTS

| | | | | |
|---|---|---|---|---|
| 4,167,041 A | * | 9/1979 | Curlander et al. ............ | 714/48 |
| 5,047,960 A | * | 9/1991 | Sloan ........................... | 707/507 |
| 5,561,766 A | * | 10/1996 | Kitamori ....................... | 714/43 |
| 5,848,420 A | * | 12/1998 | Xu ............................... | 707/104.1 |
| 5,982,753 A | * | 11/1999 | Pendleton et al. ........... | 370/252 |
| 5,987,246 A | * | 11/1999 | Thomsen et al. ............ | 717/109 |
| 6,240,472 B1 | * | 5/2001 | Hu ................................ | 710/72 |
| 6,282,586 B1 | * | 8/2001 | Bullough ...................... | 710/18 |
| 6,286,060 B1 | * | 9/2001 | DiGiorgio et al. ............ | 710/31 |
| 6,449,662 B1 | * | 9/2002 | Armitage ....................... | 710/8 |
| 6,477,581 B1 | * | 11/2002 | Carpenter et al. ........... | 709/238 |
| 6,493,771 B1 | * | 12/2002 | Fong ............................ | 710/15 |

\* cited by examiner

*Primary Examiner*—Christopher B. Shin
(74) *Attorney, Agent, or Firm*—Lee & Hayes, PLLC

(57) ABSTRACT

An application program is configured to communicate with a particular type of peripheral through a computer serial port. During times when no device is connected, the application program monitors the serial port to detect when a new device is connected. The application program then determines whether the peripheral of the type with which the application program is designed to communicate. If it is not, the application program displays a prompt, offering to relinquish the serial port for use by another program.

26 Claims, 3 Drawing Sheets

FACILITATING COMMUNICATIONS PORT SHARING

RELATED APPLICATIONS

This application claims the benefit of U.S. Provisional Application No. 60/137,847, filed Jun. 7, 1999, to Stephen D. Flanagin.

TECHNICAL FIELD

This invention relates to using and managing computer communications ports such as serial ports that are under the control of a computer operating system.

BACKGROUND

Conventional desktop or portable computers often have a communications port that uses a serial bit protocol, in which data bits are sent serially over a pair of bi-directional signal lines. Although this type of connection is perhaps not the most efficient or flexible, it is widely used because of its simplicity.

Serial ports are used for communications with a variety of different devices, such as printers, digital cameras, GPS (global positioning system) devices, personal organizers, portable or handheld computers, etc. Devices such as these are often dependent on a desktop or "base" computer for realization of their full functionality. For example, a digital camera captures pictures but is not usually equipped with ways to manipulate or print the pictures. Instead, the pictures are transferred to a base computer for manipulation, printing, and long-term storage. Similarly, personal organizers often work well in conjunction with a base computer— rather then entering data with the limited input capabilities of the personal organizer, data can be entered at the more capable desktop computer and then downloaded to the personal organizer using a serial communications link.

Thus, many serial devices are used in conjunction with application programs that execute on the base computer. The application programs are configured respectively for the different types of serial devices. In many cases, the application programs are installed once, and are configured to execute continuously thereafter-although they may be hidden from view. For example, such "background" software might be used in conjunction with a personal organizer device that is only sporadically connected to the serial port of the base computer. Whenever the personal organizer is connected, the application program automatically attempts to update the data of the personal organizer. In some cases, the base computer and peripheral device are configured to "synchronize" their data, so that changes made in one device are automatically reflected in the other. For example, a contact database might be synchronized like this.

Portable devices running the "Windows CE" operating system operate in this manner. A synchronization program runs continuously on a base computer, waiting for the connection of a portable device. At startup, the synchronization program interacts with the "Windows" operating system to obtain exclusive use of the base computer's serial port. Thereafter, it monitors input from the serial port (in conjunction with the operating system) to detect when a compatible portable device is connected. In this environment, compatible devices are configured to identify themselves by automatically transmitting a predefined character string upon connection to the serial port of the base computer. This notifies the sychronization program that the portable device has been connected and that it is ready to receive further instructions.

The synchronization program thus monopolizes the serial port for its own purposes. Although this is acceptable in many situations, it can create problems when a user wants to use or share the serial port for another purpose-such as for communications with a different type of device. For example, suppose the user installs a new program on the base computer for communicating with a digital camera. Upon startup, the new program requests use of the serial port from the operating system. However, the serial port is already in use by the previously installed synchronization program. Accordingly, the operating system refuses the request from the new program, and the new program typically terminates with some type of error message.

Before the new program can function correctly, it is necessary in most cases to terminate the program that is already using the serial port. Although this should be a simple matter, it can be difficult to identify exactly what has caused the problem. Specifically, the user does not always recall which program might be using the serial port.

It would be convenient in this situation for the new program to more specifically identify the source of the problem, such as by identifying the previously installed program that is using the serial port. However, this information is typically unavailable either to the new program or to the operating system itself Thus, the new program usually is able only to state something like "The port is already in use by another program." This is often of little help to the user.

Furthermore, even an identification of the previously installed program is of little use in some situations, since it is not always apparent how to terminate the offending program.

The invention described below addresses this situation, providing a convenient way for different programs to use the same serial port with different peripherals, without requiring detailed knowledge on the part of the computer user.

SUMMARY

Described below is an application program configured to use a serial port for communications with a compatible type of peripheral device. The application program monitors the serial port to detect when a peripheral device is connected. Upon detecting a peripheral device connection, the application program determines whether the connected device is of the type with which the application program is designed to communicate. If it is not, the application program offers to relinquish control of the serial port so that another program can use the serial port for communications with the newly connected peripheral device. If the application program is activated later, it asks the user if he or she wishes to have the application program resume control of the serial port.

DETAILED DESCRIPTION

Figure 1:
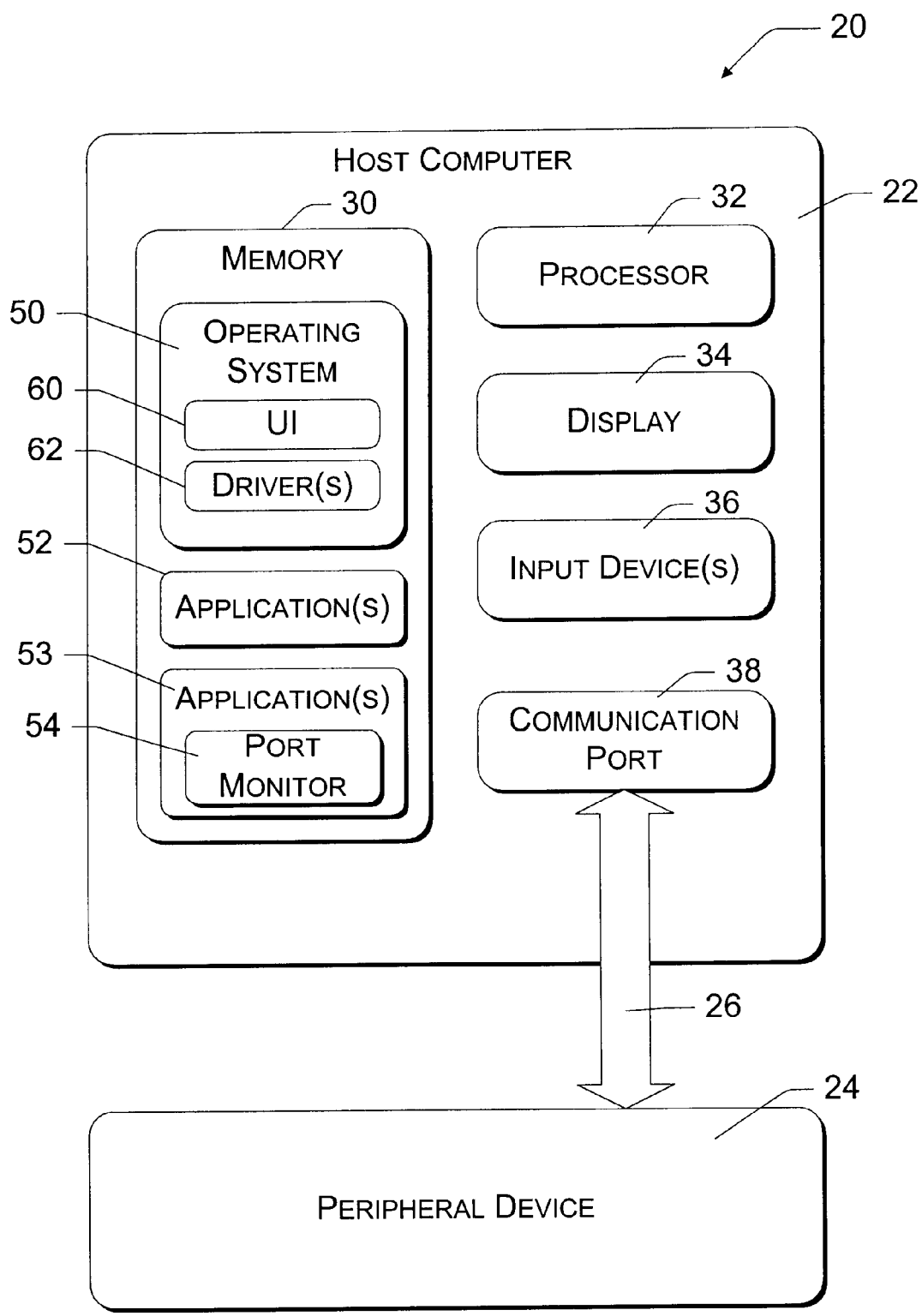
FIG. 1 is a block diagram of a base computer and a compatible peripheral device.

FIG. 1 shows a computer system 20 having a host or base computer 22 connected to communicate with a peripheral device 24 through a serial communications link 26. The base computer is a conventional computer such as a desktop computer, portable computer or other processor-based device. The peripheral device might be any one of a number of different devices such as a personal organizer or assistant, a so-called "palm-size" computer, some other type of portable computer, a digital camera, a GPS device, etc. In some cases, the peripheral device is configured to execute an operating system such as Microsoft Corporation's "Windows CE" operating system.

Base computer 22 has a computer-readable storage media or memory 30, processor 32, a display 34, and one or more input devices 36 (e.g., keyboard, mouse, etc.). The memory 30 generally includes both volatile memory (e.g., RAM) and non-volatile memory (e.g., Flash, ROM, hard disk, etc.). Computer programs reside on and execute from these different types of memory. One or more of such computer programs are configured to implement the functionality described below.

Computer 22 is also equipped with one or more communications ports, including at least one serial communications port 38. Serial port 38 is used for communications with peripheral device 24, and conforms to a widely accepted serial port standard referred to as "RS-232".

An operating system 50 resides in memory 30 for execution by processor 32. Computer 22 preferably runs a "Windows" brand operating system from Microsoft Corporation, such as "Win32" based products (e.g., "Windows 95," "Windows 98," etc.). The operating system controls and supervises system resources such as communications ports. Specifically, it accepts requests for use of serial port 38 and grants exclusive use of the serial port to the first requesting application program. If another application program subsequently requests to use the serial port, the request will be denied since the port is already in use. However, the operating system does not typically return information regarding the program entity actually using the port.

One or more application programs 52 and 53 are loaded into memory 30 and run on the operating system 50. Examples of such application programs include email programs, scheduling programs, remote device services programs, word processing programs, Internet browser programs, and so on.

More specifically, at least one of the application programs 53 is designed to communicate with a compatible peripheral device through serial communications port 38. As an example, application program 53 might comprise a synchronization program configured to synchronize or otherwise update a contact database in a peripheral device such as an electronic personal organizer.

An application program that has been granted exclusive use of the serial communications port can monitor and control various aspects of the port in conjunction with the operating system. Specifically, the application program makes calls to application program interfaces (APIs) of the operating system to obtain exclusive use of the serial port and then to read and write various parameters of the serial port as well as serial data itself. In addition, certain aspects can be monitored through the use of callback functions—functions of the application program that are registered with the operating system, which are then invoked by the operating system to report events such as status changes and received data. Such APIs and callback functions are defined by the "Win32" API, which is part of "Windows" based operating systems.

When an application program wishes to release the serial port, it can do so through additional API functions of the operating system. Once the port is released, another application program can request and gain exclusive control of the serial port.

In accordance with the invention, application program 53 runs continuously, in a "background" (non-visible) mode, in order to communicate with a compatible type of peripheral device. Thus, during startup application program 53 requests and obtains exclusive control of serial port 38 from operating system 50. In addition, application program 53 implements a port monitor 54 that detects when a non-compatible peripheral device is connected to the communications port. When this happens, application program 53 offers to free the communications port from exclusive control, so that a user can initiate a different application program for use with the newly connected device.

Figure 2:
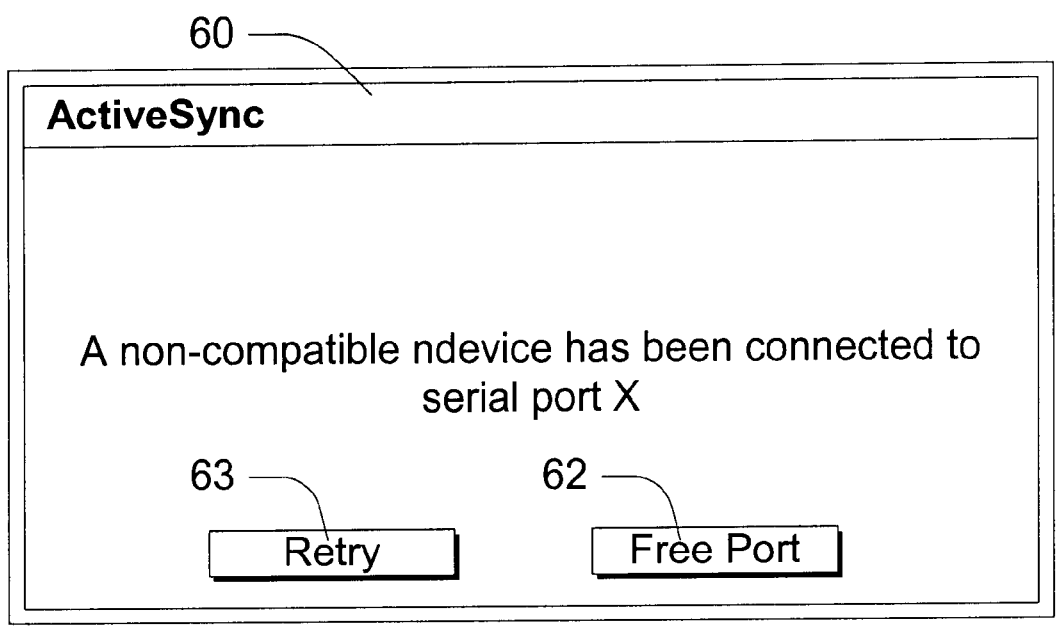
FIG. 2 is an example of a user prompt.

FIG. 2 shows a visual prompt 60 presented by port monitor 54 upon detection of a non-compatible peripheral device. This prompt serves at least two purposes. First and most basically, it identifies the application program that currently has exclusive use of the serial port. This allows the user to take measures, if appropriate, to remove or disable the application program if it is no longer needed. Second, the prompt allows the user to instruct application program 53 to immediately relinquish the serial port, so that the port can subsequently be used by another application program for communications with the newly connected peripheral device.

More specifically, prompt 60 contains the text "A non-compatible device has been connected to serial port X" and contains two button controls 62 and 63 that can be alternatively selected by the user. Button control 62, labeled "Free Port", instructs application program 53 to immediately relinquish control of the serial port. In many embodiments, this will also terminate application program 53, although the application program might remain active in other embodiments. Button control 63, labeled "Retry Connection", instructs application program 53 to retry communications with the connected serial device. The user selects this option if the connected device is indeed compatible with application program 53, but has not been properly recognized for some reason.

Port monitor 54 monitors serial port 38 by monitoring its "carrier detect" (CD) signal line. This signal line is also sometimes referred to as the "received line signal detector" (RLSD) line. The CD or RLSD signal line is defined by the RS-232 serial communications standard, and is activated by most serial peripheral devices. The RS-232 "clear to send" (CTS) and "data set ready" (DSR) lines are also activated by the peripheral device, as part of the normal RS-232 handshaking protocol, and can also be used to detect connection of a peripheral device.

In the "Win32" environment of host computer 20, the CD line can be monitored by registering a callback function with the operating system. This callback function will be invoked upon any change in status of the CD line. Thus, it will be invoked whenever a peripheral device is connected or disconnected from port 38.

In addition, port monitor 54 determines whether any newly connected peripheral device is compatible with application program 53. In this environment, the term "compatible" means that the peripheral device is configured to communicate with and to respond appropriately to commands from application program 53. In the specific embodiment described herein, application program 53 is configured to work with PPP (point-to-point protocol) devices, which automatically transmit a predefined initialization character string ("client") upon connection to a host device. If this string is received by base computer 20 within a predefined period after the peripheral device is connected, port monitor 54 concludes that the connected device is a compatible device. Otherwise, the port monitor concludes that the device is of a type other than the type designed to work with application program 53. A baud rate detection algorithm is optionally used to accommodate peripheral devices utilizing different baud rates. The peripheral device can be instructed to repeatedly send its predefined initialization character string by repeatedly cycling the RS-232 "data terminal ready" (DTR) line of the RS-232 serial port. This allows host computer 20 to attempt recognition of the input string using different baud rates.

Figure 3:
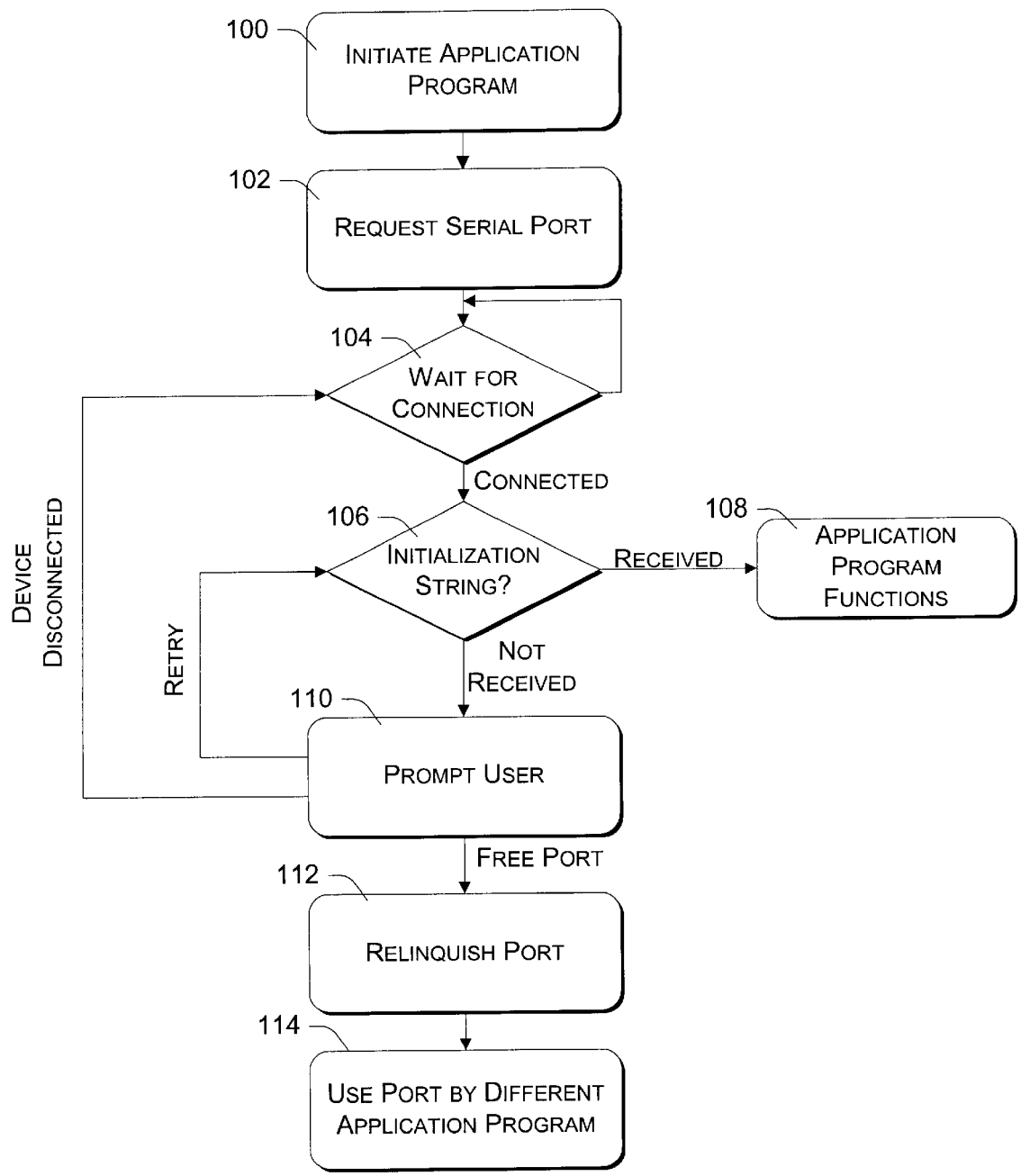
FIG. 3 is a flowchart illustrating methodological aspects of the described embodiment of the invention.

FIG. 3 shows methodological steps in accordance with the described embodiment of the invention. Step 100 comprises initiating or activating application program 53 and its port monitor 54. Step 102 comprises requesting and obtaining exclusive control of serial port 38 from operating system 50, for communications with a peripheral device of a particular type (in the example, a PPP device). Step 104 comprises monitoring to detect connection of a peripheral device. In the described embodiment, this involves waiting for invocation of a callback function registered with the operating system. Step 106 is initiated upon detecting the connection of a peripheral device, and comprises determining whether a predefined character string is received through the serial port within a predetermined time limit. If the predefined character string is received, step 108 is performed by proceeding with normal functions of application program 53, including further communications with peripheral device 24. Otherwise, if the predefined character string is not received within the predetermined time limit, a step 110 is performed by prompting the user with an offer to relinquish exclusive control of the serial port. At this point, there are three possible actions that might be performed. First, the user might disconnect the device without responding to the prompt. The port monitor will detect this and respond by closing the prompt and looping back to step 104. Second, the user might select the "retry" option, in which case the DTR line is toggled and execution loops back to step 106. Third, the user might select the "Free Port" option, whereupon a step 112 is performed of relinquishing control of the serial port so that it can be used by another program (step 114). If desired, the user can eventually instruct application program 53 to regain control of the serial port by starting the application (assuming that the other program has relinquished it), whereupon execution begins again at step 102.

The features described above allow different application programs to use a single serial port with different peripherals without requiring a user to anticipate conflicts and to manually terminate programs. As an example, suppose that a computer has been configured to run a background synchronization program in conjunction with an electronic personal organizer. Further, suppose that the user now wishes to connect a digital camera to the serial port for use with a different communications program. Upon physically connecting the camera to the serial port, the synchronization program will display a prompt similar to that of FIG. 2. This prompt reveals to the user the exact nature of the serial port conflict that has arisen, and also allows the user to instruct the synchronization program to free the serial port for subsequent use by the camera communications program. Having now become aware of the problem, the user can—if appropriate—take the additional step of manually uninstalling or permanently disabling the synchronization program.

Although the description above uses language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A computer system comprising:

a serial communications port;

an operating system that grants exclusive control of the serial communications port to requesting application programs;

an application program configured to request exclusive control of the communications port from the operating system, for communications with a particular type of peripheral device;

wherein the application program monitors the serial communications port to detect connection of peripheral devices;

wherein upon detecting connection of a peripheral device not of the particular type, the application program prompts the user with an offer to relinquish exclusive control of the serial communications port so that the serial communications port can be used by other application programs.

2. A computer system as recited in claim 1, wherein the application program identifies itself upon detecting connection of a peripheral device not of the particular type.

3. A computer system as recited in claim 1, wherein the application program detects connection of peripheral devices by receiving notifications from the operating system upon connection of peripheral devices.

4. A computer system as recited in claim 1, wherein the application program identifies a peripheral device of the particular type by detecting reception of a predefined character string via the serial communications port.

5. A computer system as recited in claim 1, wherein the application program offers to free the communications port by displaying a message to the user.

6. A computer system as recited in claim 1, wherein the application program, upon initiation after relinquishing exclusive control of the serial communications port, prompts a user to determine whether to again request exclusive control of the serial communications port.

7. A computer system comprising:

a communications port;

an application program configured to obtain exclusive control of the communications port for communications with a particular type of peripheral device;

a port monitor that detects when a peripheral device not of the particular type is connected to the communications port, and in response offers to free the communications port from exclusive control by the application program.

8. A computer system as recited in claim 7, wherein the port monitor is part of the application program.

9. A computer system as recited in claim 7, wherein the communications port is a serial port having a CD signal, and the port monitor monitors the CD signal to detect connection of a peripheral device.

10. A computer system as recited in claim 7, wherein the port monitor identifies a peripheral device of the particular type by detecting reception of a predefined character string.

11. A computer system as recited in claim 7, wherein the port monitor offers to free the communications port by prompting a user.

12. A computer system as recited in claim 7, wherein the port monitor offers to free the communications port by displaying a message to a user.

13. A computer system as recited in claim 7, wherein the port monitor identifies the application program when offering to free the communications port.

14. A computer system as recited in claim 7, wherein the application program, upon initiation after freeing the communications port from exclusive control, prompts a user to determine whether to again obtain exclusive control of the serial communications port.

15. A computer-readable storage medium containing an application program comprising:

obtaining exclusive control of a communications port for communications with a particular type of peripheral device;

monitoring to detect connection of a peripheral device not of the particular type to the communications port;

in response to detecting connection of a peripheral device not of the particular type to the communications port, prompting a user with an offer to free the communications port from exclusive control by the application program.

16. A computer-readable storage medium as recited in claim 15, wherein said obtaining comprises requesting control of the communications port from an operating system.

17. A computer-readable storage medium as recited in claim 15, wherein the communications port is a serial port having a CD signal, and said monitoring comprises monitoring the CD signal to detect connection of a peripheral device.

18. A computer-readable storage medium as recited in claim 15, wherein said monitoring comprises identifying a peripheral device of the particular type by detecting reception of a predefined character string.

19. A computer-readable storage medium as recited in claim 15, further comprising:

upon initiation of the application program after freeing the communications port from exclusive control by the application program, prompting a user to determine whether to again obtain exclusive control of the communications port.

20. A computer-readable storage medium as recited in claim 15, wherein said prompting comprises displaying a message to the user.

21. A computer-readable storage medium as recited in claim 15, wherein said prompting comprises identifying the application program.

22. A method of using a serial port, comprising:

requesting exclusive control of the serial port from an operating system, for communications with a peripheral device of a particular type;

monitoring to detect connection of a peripheral device not of the particular type to the serial port;

in response to detecting connection of a peripheral device not of the particular type to the serial port, prompting a user with an offer to relinquish exclusive control of the serial port;

relinquishing exclusive control of the serial port in response to the user indicating acceptance of the offer.

23. A method as recited in claim 22, wherein the communications port is a serial port having a CD signal, and said monitoring comprises monitoring the CD signal to detect connection of a peripheral device.

24. A method as recited in claim 22, wherein said monitoring comprises identifying a peripheral device of the particular type by detecting reception of a predefined character string.

25. A method as recited in claim 22, wherein said prompting comprises displaying a message to the user.

26. A method as recited in claim 22, wherein said prompting comprises identifying the application program.

\* \* \* \* \*

UNITED STATES PATENT AND TRADEMARK OFFICE
CERTIFICATE OF CORRECTION

PATENT NO. : 6,560,660 B1
DATED : May 6, 2003
INVENTOR(S) : Flanagin

It is certified that error appears in the above-identified patent and that said Letters Patent is hereby corrected as shown below:

<u>Title page,</u>
Item [75], replace "Redmond, WA" with -- Sammamish, WA --.

<u>Column 1,</u>
Line 65, replace "sychronization" with -- synchronization --.

Signed and Sealed this

Second Day of September, 2003

JAMES E. ROGAN
*Director of the United States Patent and Trademark Office*